US008662514B2

(12) United States Patent
James (10) Patent No.: US 8,662,514 B2
(45) Date of Patent: *Mar. 4, 2014

(54) MULTI-PERSON TRICYCLE

(76) Inventor: Benjamin James, Alameda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/429,337

(22) Filed: Mar. 24, 2012

(65) Prior Publication Data

US 2012/0181769 A1      Jul. 19, 2012

Related U.S. Application Data

(63) Continuation of application No. 12/548,422, filed on Aug. 26, 2009, now Pat. No. 8,162,339.

(60) Provisional application No. 61/091,741, filed on Aug. 26, 2008, provisional application No. 61/236,867, filed on Aug. 25, 2009.

(51) Int. Cl.
*B62M 1/00* (2010.01)

(52) U.S. Cl.
USPC ............................ 280/231; 280/270; 280/282

(58) Field of Classification Search
USPC .................... 280/209, 231, 273, 282
See application file for complete search history.

(56) References Cited

U.S. PATENT DOCUMENTS

| 242,212 | A | * | 5/1881 | McKenzie | 280/251 |
| 3,870,338 | A | * | 3/1975 | Holub | 280/209 |
| 5,511,809 | A | * | 4/1996 | Sagi | 280/209 |
| 6,022,036 | A | * | 2/2000 | Chartrand | 280/209 |
| 8,162,339 | B2 | * | 4/2012 | James | 280/231 |

FOREIGN PATENT DOCUMENTS

JP              06191460 A    *   7/1994

* cited by examiner

*Primary Examiner* — Tony Winner
*Assistant Examiner* — Jacob Knutson
(74) *Attorney, Agent, or Firm* — Dean E. Wolf, Esq.

(57) ABSTRACT

Various embodiments of a multi-person tricycle are disclosed. In at least one embodiment, the multi-person tricycle includes two front drive wheel assemblies, each having an independent drive train assembly, and includes a rear wheel assembly operably connected to a steering mechanism which may be simultaneously or independently operated by one or more riders. In at least one embodiment, the multi-person tricycle may be configured or designed to enable two front riders to sit side-by-side, and further may be configured or designed to enable each rider to independently exert and/or vary his or her own pedaling force and/or pedaling cadence without substantially affecting steering of the vehicle.

10 Claims, 13 Drawing Sheets

MULTI-PERSON TRICYCLE

RELATED APPLICATION DATA

The present application claims benefit, pursuant to the provisions of 35 U.S.C. §119, of U.S. Provisional Application Ser. No. 61/091,741, naming James et al. as inventors, and filed Aug. 26, 2008, the entirety of which is incorporated herein by reference for all purposes.

The present application also claims benefit, pursuant to the provisions of 35 U.S.C. §119, of U.S. Provisional Application Ser. No. 61/236,867, naming James et al. as inventors, and filed Aug. 25, 2009, the entirety of which is incorporated herein by reference for all purposes.

This application is a continuation application, pursuant to the provisions of 35 U.S.C. §120, of prior U.S. patent application Ser. No. 12/548,422, titled "MULTI-PERSON TRICYCLE" by James et al., filed on 26 Aug. 2009, the entirety of which is incorporated herein by reference for all purposes.

BACKGROUND

In recent decades, manufacturers and designers of adult tricycles have typically focused their tricycle design and configuration efforts on producing adult tricycles with a lowered center of gravity in order to gain various advantageous features such as, for example, stability and reduced wind resistance.

BRIEF DESCRIPTION OF THE DRAWINGS

FIG. 6 illustrates an example of various the components that at least one tricycle embodiment may be assembled from.

DETAILED DESCRIPTION OF EXAMPLE EMBODIMENTS

Overview

Various aspects described or referenced herein may be directed to different embodiments of an inventive multi-person tricycle having various features as illustrated and described and/or referenced herein.

Various embodiments of a multi-person tricycle are disclosed. In at least one embodiment, the multi-person tricycle includes two front drive wheel assemblies, each having an independent drive train assembly, and includes a rear wheel assembly operably connected to a steering mechanism which may be simultaneously or independently operated by one or more riders. Steering is controlled by either rider via a single steering mechanism. In at least one embodiment, the multi-person tricycle may be configured or designed to enable two front riders to sit side-by-side, and further may be configured or designed to enable each rider to independently exert and/or vary his or her own pedaling force and/or pedaling cadence without substantially affecting steering of the vehicle. In at least one embodiment, the entire tricycle apparatus may be constructed or assembled using components of two ordinary bicycles and a few other commonly available parts. The tricycle apparatus may disassemble easily into several components and/or assemblies which collectively take up relatively little volume, thereby facilitating ease of shipment and storage. Additionally, re-assembly of the tricycle may be quickly and easily performed by a person without requiring use of any tools. The multi-person tricycle is easy to operate and provides for improved safety when navigating through street traffic because the configuration of the tricycle places the riders' head heights at an even level with passenger cars.

Additional objects, features and advantages of the various aspects described or referenced herein will become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details may be set forth in order to provide a thorough understanding of one or more aspects and/or features described or referenced herein. It will be apparent, however, to one skilled in the art, that one or more aspects and/or features described or referenced herein may be practiced without some or one or more of these specific details. In other instances, well known process steps and/or structures have not been described in detail in order to not obscure some of the aspects and/or features described or referenced herein.

One or more different inventions may be described in the present application. Further, for one or more of the invention (e.g., s) described herein, numerous embodiments may be described in this patent application, and may be presented for illustrative purposes only. The described embodiments may not be intended to be limiting in any sense. One or more of the invention (e.g., s) may be widely applicable to numerous embodiments, as may be readily apparent from the disclosure. These embodiments may be described in sufficient detail to enable those skilled in the art to practice one or more of the invention (e.g., s), and it may be to be understood that other embodiments may be utilized and that structural, logical, software, electrical and other changes may be made without departing from the scope of the one or more of the invention (e.g., s). Accordingly, those skilled in the art will recognize that the one or more of the invention (e.g., s) may be practiced with various modifications and alterations. Particular features of one or more of the invention (e.g., s) may be described with reference to one or more particular embodiments or figures that form a part of the present disclosure, and in which may be shown, by way of illustration, specific embodiments of one or more of the invention (e.g., s). It may be understood, however, that such features may not be limited to usage in the one or more particular embodiments or figures with reference to which they may be described. The present disclosure may be neither a literal description of one or more embodiments of one or more of the invention (e.g., s) nor a listing of features of one or more of the invention (e.g., s) that may be present in one or more embodiments.

Headings of sections provided in this patent application and the title of this patent application may be for convenience only, and may not be to be taken as limiting the disclosure in any way.

Devices that may be in communication with at least one other need not be in continuous communication with at least one other, unless expressly specified otherwise. In addition, devices that may be in communication with at least one other may communicate directly or indirectly through one or more intermediaries.

A description of an embodiment with several components in communication with at least one other does not imply that one or more such components may be required. To the contrary, a variety of optional components may be described to illustrate the wide variety of possible embodiments of one or more of the invention (e.g., s).

When a single device or article may be described, it will be readily apparent that more than one device/article (e.g., whether or not they cooperate) may be used in place of a single device/article. Similarly, where more than one device or article may be described (e.g., whether or not they cooperate), it will be readily apparent that a single device/article may be used in place of the more than one device or article.

The functionality and/or the features of a device may be alternatively embodied by one or more other devices that may not be explicitly described as having such functionality/features. Thus, other embodiments of one or more of the invention (e.g., s) need not include the device itself.

Techniques and mechanisms described or referenced herein will sometimes be described in singular form for clarity. However, it may be appreciated that particular embodiments include multiple iterations of a technique or multiple instantiations of a mechanism unless noted otherwise.

As described previously, manufacturers and designers of adult tricycles have typically focused their tricycle design and configuration efforts on producing adult tricycles with a lowered center of gravity in order to gain various advantageous features such as, for example, stability and reduced wind resistance. However, such modern and traditional tricycle configurations leave riders vulnerable to vehicle impact, poor visibility, obscured visibility in traffic, etc.

In contrast to conventional tricycle designs, various tricycle embodiments described herein provide various features, advantages and/or benefits not previously taught or suggested in the prior art. For example, in at least one embodiment, the multi-person tricycle includes two front drive wheel assemblies, each having an independent drive train assembly, and includes a rear wheel assembly operably connected to a steering mechanism which may be simultaneously or independently operated by one or more riders. Steering may be controlled by either rider via a single steering mechanism. The unique independent drive train configuration enables each of the front two riders to simultaneously and/or independently contribute a respective peddling force and/or pedaling cadence which may be different from (e.g., and/or disproportionate from) that of the other rider, without significantly or substantially affecting the steering and/or tracking of the vehicle. It is also possible for one rider to pedal while the other rider rests (e.g., by not pedaling), without substantially or significantly affecting the tracking and/or steering of the vehicle.

In at least one embodiment, the multi-person tricycle may be configured or designed to enable two front riders to sit side-by-side, and further may be configured or designed to enable each rider to independently exert and/or vary his or her own pedaling force and/or pedaling cadence without substantially affecting steering of the vehicle. The side-by-side seating configuration encourages a social conveyance and/or interaction similar to that typically experienced between a driver and passenger of a car or other motor vehicle.

In at least one embodiment, the entire tricycle apparatus may be constructed or assembled using components of two ordinary bicycles and a few other commonly available parts. The tricycle apparatus may disassemble easily into several components and/or assemblies which collectively take up relatively little volume, thereby facilitating ease of shipment and storage. Additionally, re-assembly of the tricycle may be quickly and easily performed by a person without requiring use of any tools.

The independent drive configuration of the two front wheel assemblies allows for a new and novel ease of disassembly for transport and storage. For example, in at least one embodiment, the tricycle may be disassembled into convenient sub-assemblies, including, for example, two front wheel assemblies and a rear wheel assembly. Further, in the tricycle's disassembled form, each of the front wheel assemblies may comprise it's own respective wheel, chain ring (e.g., s), gear (e.g., s) and chain (e.g., and/or other components such as pedals, frame, etc.) which may remain assembled together in their respectively assembled forms. This advantageously provides for improved and more convenient tricycle disassembly and re-assembly than that of rear wheel drive tricycle configurations where the lengthy chain (e.g., s) may be cumbersome and may significantly impede disassembly and/or re-assembly.

The multi-person tricycle is also easy to operate and provides for improved safety when navigating through street traffic since, for example, the configuration of the tricycle places each rider's head heights at an even level with passenger cars, allowing the rider (e.g., s) to view surrounding traffic as well as allowing drivers of other vehicles to more readily observe the tricycle and its rider (e.g., s). Additionally, in at least one embodiment, the configuration of the tricycle places each rider's body above the bumper height of most cars and/or other street vehicles, while sacrificing very little in stability.

In at least one embodiment, the multi-person tricycle may be configured or designed to include an electric hub which facilitates the vehicle to be used in a manner similar to the way one would use an automobile for "running errands". In at least one embodiment the electric hub may be mounted to power the rear wheel of the rear wheel assembly. Also, this hub allows a third rider to contribute to the power of the vehicle electrically by pedaling (e.g., or hand cranking) a generator. In this way, the tricycle may usher in the acceptance of human powered hybrids on our city streets. Moreover, this new and novel light-weight human powered vehicle may allow our population to transition into an affordable alternative to fossil fuel consuming vehicles.

LIST OF EXAMPLE REFERENCED PART NUMBERS

Figure 1:
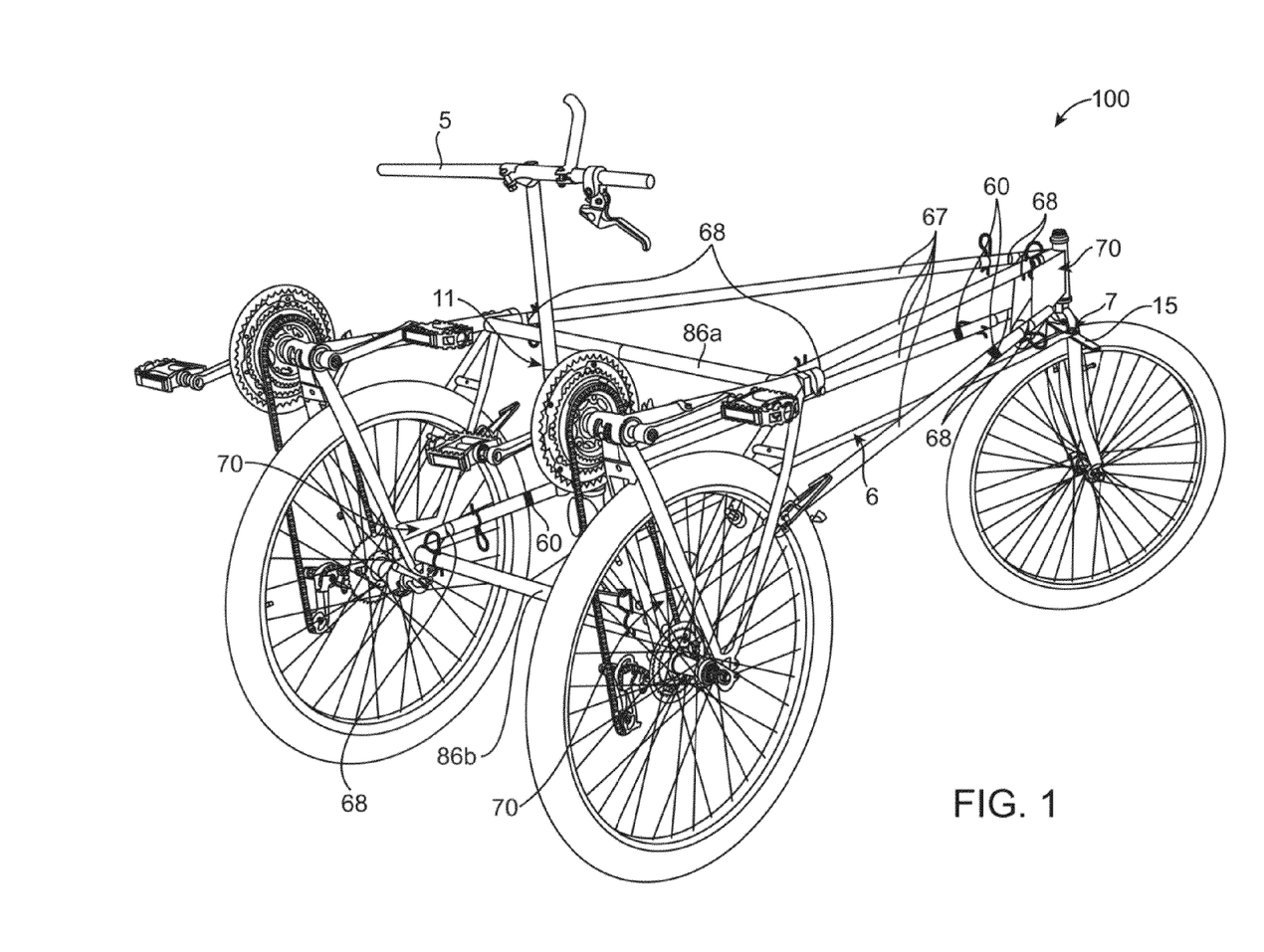
FIG. 1 shows a perspective view showing a specific example embodiment of an inventive multi-person tricycle in accordance with various aspects described herein.
Figure 2:
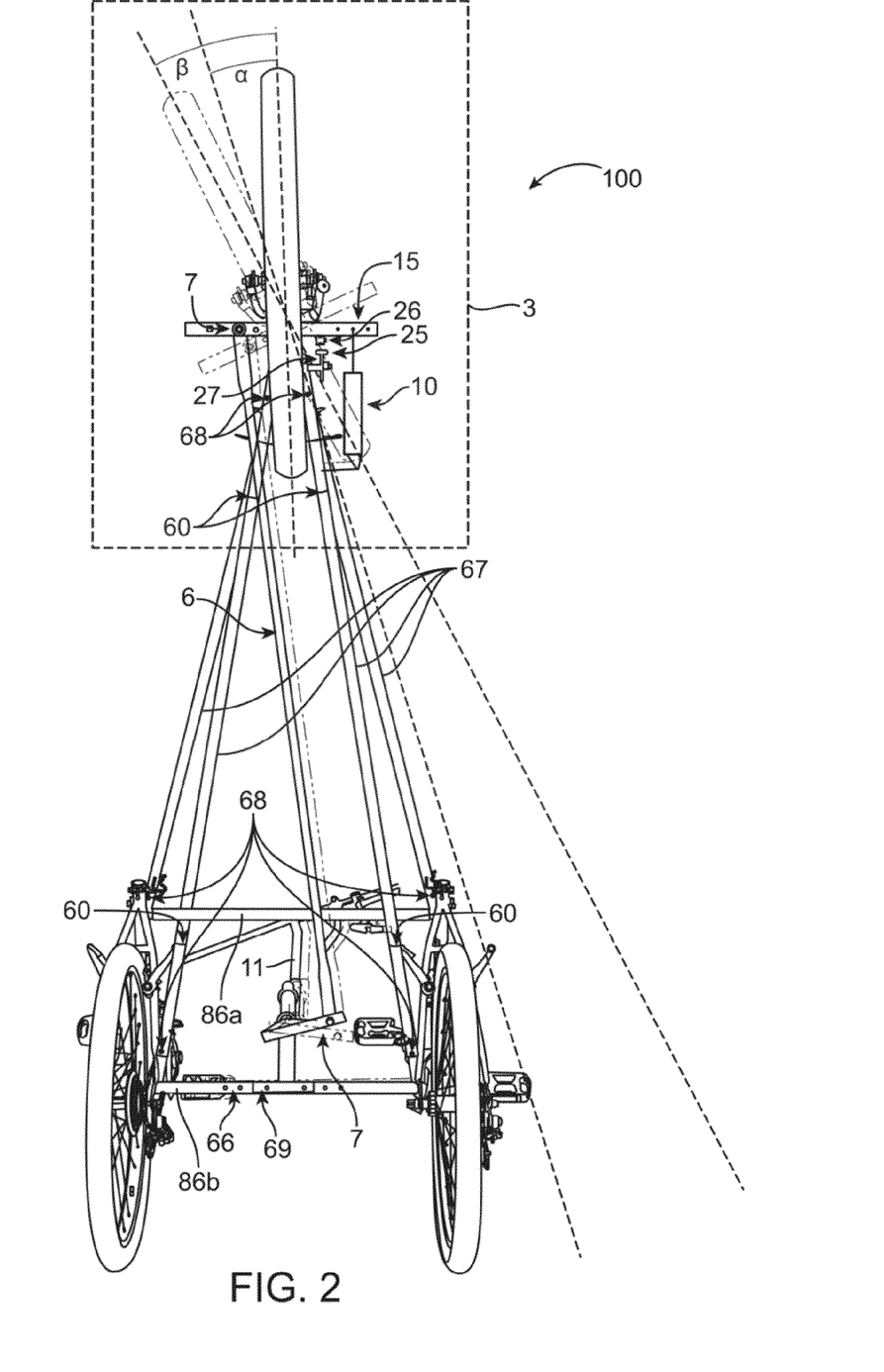
FIG. 2 shows a bottom view of the multi-person tricycle illustrated in FIG. 1.
Figure 3:
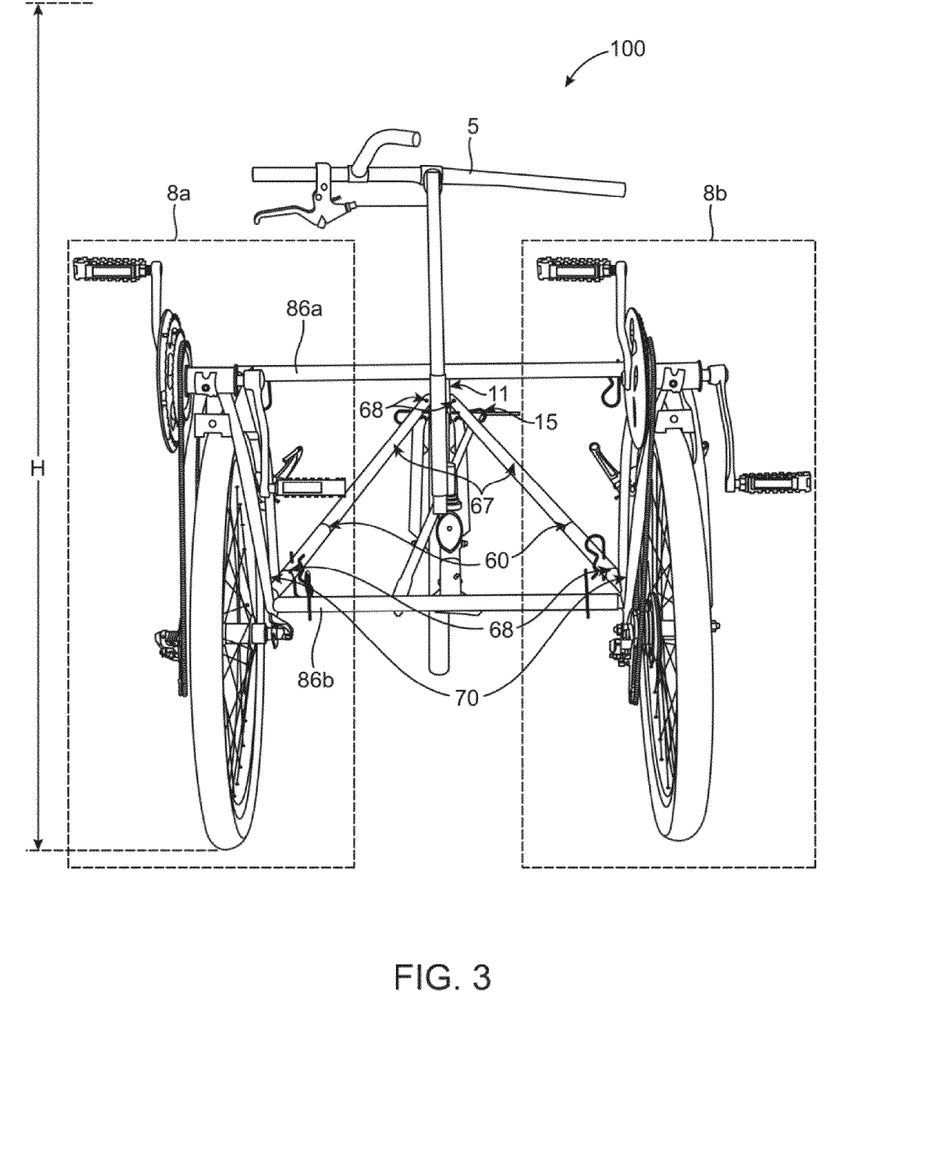
FIG. 3 shows a front view of the multi-person tricycle illustrated in FIG. 1.

100 Multi-person tricycle assembly
400 Disassembled components
500 Three alternate embodiments
600 Traditional bicycle components
603 Traditional bicycle front wheel, headset and fork
605 Handle bar
608a Traditional bicycle rear triangle drive train
608b Traditional bicycle rear triangle drive train 624 Traditional bicycle headset
700 Traditional bicycle components
1200 Alternative perspective
1250 Alternative perspective
2 Human pedalers (e.g., not referenced)
3 Rear steering wheel assembly
5 Shared handle bar
6 Steering push rod
7 Steering sensitivity adjustment
8a Right independent drive train
8b Left independent drive train
10 Steering dampener
11 Adjustable telescoping handle bar mount
15 Adjustment for steering dampening
17 Handle bar pivot
24 Rear steering wheel assembly headset
25 Steering limit mechanism
26 Steering stop
27 Steering limit adjustment
30 Alternative embodiment device for linking drive trains
31a Alternative embodiment right pedal for center rider
31b Alternative embodiment left pedal for center rider
44 Alternative embodiment bench seat
60 Extended mounting sleeves
66 Steering placement alignment holes
67 (e.g., a,b,c,d) Longitudinal frame members
68 Frame pivots
69 Handle bar mount sleeve
70 Strengthening gussets
85 Battery support
86a Upper lateral frame member.
86b Lower lateral frame member
Angle $\alpha$: Minimum steering angle;
Angle $\beta$: Maximum riding steering angle.
H Height of rider's head FIGS. 1, 2, and 3 show specific example embodiment of a three wheel multi-person vehicle 1. As illustrated in the example embodiments of FIGS. 1-3, the multi-person tricycle comprises a plurality of tubular members which may be composed of suitable materials such as, for example, steel, alloy steel, aluminum, carbon fiber, and/or other suitable bicycle frame and materials. According to various embodiments, the tubular members may be joined by welding, brazing, fastening, and/or like mechanical attachment method.

As illustrated in the example embodiments of FIGS. 1-3, two independent drive train assemblies (e.g., 8a, 8b, FIG. 3) may be linked by lateral frame members 86. In one embodiment, this rigid assembly is linked to a rear steering wheel assembly (e.g., 3) by longitudinal frame members 67. This steering wheel assembly may be linked by push rod assembly 6 to a telescoping and/or adjustable handle bar mount 11 via a pivot mounted to a repositionable sleeve 69, which, for example, may be mounted or attached to lower lateral bar 86. This entire assembly may be topped by handle bar 5, which functions as the vehicle's steering mechanism.

Rear steering wheel assembly (e.g., 3, FIG. 2) may be dampened by dampener 10 mounted to longitudinal frame member and this dampening may be adjusted through a plurality of settings 15 mounted to rear steering wheel assembly. Likewise, steering sensitivity may be adjusted through a plurality of settings 7. Maximum turn angle may be set for different conditions by steering adjuster 25 mounted to longitudinal frame member by mount 27. As illustrated in the example embodiment of FIG. 1, this assembly comes in contact with stop 26 mounted to rear steering wheel assembly.

Examples of various possible turn angle limits are shown in FIG. 2. One turn angle limit may be set based on the limit at which any object cleared by front wheel assemblies and pedals will not be clipped by rear steering wheel assembly (e.g., as the vehicle passes by the object). In at least one embodiment, another turn angle limit may be set based on an appropriate limit to prevent wheel damage from extreme turn angles during vehicle movement. As illustrated in the example embodiment of FIG. 2, two of the turn angles may be labeled as $\alpha$ and $\beta$, respectively. One or more limits may be removed for low speed maneuvering.

As illustrated in the example embodiment of FIG. 3, the two drive train assemblies (e.g., 8a, 8b) may each comprise a respective set of components including, for example, one or more of the following (e.g., or combinations thereof):
  pedals,
  crank arms,
  chain ring (e.g., s),
  derailleur,
  gear (e.g., s),
  wheels
  chain
  brake (e.g., s)
  wheel release mechanism (e.g., s)
  and/or other components which may typically be included on the rear frame or rear triangle assembly portion of a conventional bicycle.

Additionally, in at least one embodiment, will really be apparent from the figures, the two drive train assemblies (e.g., 8a, 8b) may each be implemented utilizing the existing (e.g., and/or substantially unaltered) rear triangle assembly portions of 2 conventional bicycles. In at least one embodiment, one or both of the drive train assemblies (e.g., 8a, 8b) may include strengthening gussets 70 for added strength and/or stability. Additionally, in at least one embodiment, another strengthening gusset may be added to the rear steering headset.

In at least one embodiment, the shift mechanisms and braking assemblies of each of the two drive train assemblies (e.g., 8a, 8b), and may be used in a conventional manner, and may be utilized in a form which is substantially unaltered from its original configuration of the conventional bicycle assembly.

In at least one embodiment, relative location of brake and shift lever mounts of each drive train assembly may remain substantially unchanged (e.g., from its original configuration of the conventional bicycle assembly) and/or and may re-positioned according to rider's preference.

As shown in the example embodiment of FIGS. 1-3, the relative orientation of the triangular shaped the drive train assemblies (e.g., 8a, 8b) may be rotated approximately 90 degrees as compared to the relative orientation of the same triangular shaped the drive train assembly as used in a conventional bicycle assembly. In at least some alternate embodiments, other angles of orientation are possible (e.g., which, for example, may range from about 0-170 degrees).

Seating members may be mounted to the upper longitudinal frame member 67 and the upper lateral frame member 86. In one embodiment, the multi-person tricycle may include a bench type-seat (e.g., 44, FIG. 5) which, for example, enables two riders of different heights to pedal side by side, and/or may enable or a single rider (e.g., positioned at the center position of the seat) to use drive train connector (e.g., 30, FIG. 5) to power both drive trains (e.g., 8a, 8b) via use of pedals 31a and 31b, which, for example, may be operably attached to the interior pedals of the drive train assemblies.

At least one alternate embodiment may include contoured bucket seats for two riders (e.g., as shown, for example, in FIGS. 8-11), and/or may include a battery mount (e.g., 85.

Figure 5:
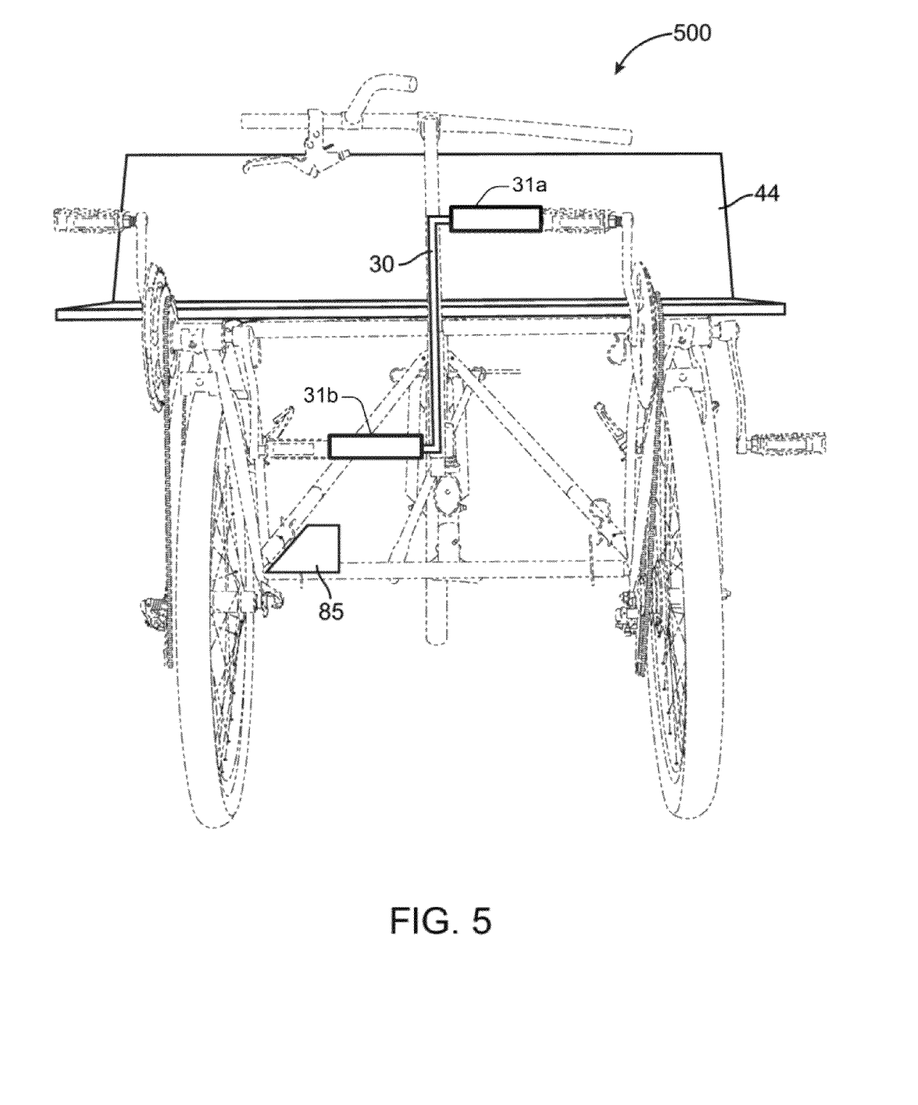
FIG. 5 shows a perspective view showing an example of an alternate embodiment of an inventive tricycle in accordance with various aspects described herein

FIG. 5), which, for example, may be attached (e.g., removably attached) to lower lateral frame member 86 and right lower longitudinal frame member 67. In at least one embodiment, the attachment of a battery to battery mount 85 may also serve as a counter balance for a single rider riding in the opposite-side bucket seat (e.g., left side seat).

Benefits/Features/Advantages

Figure 10:
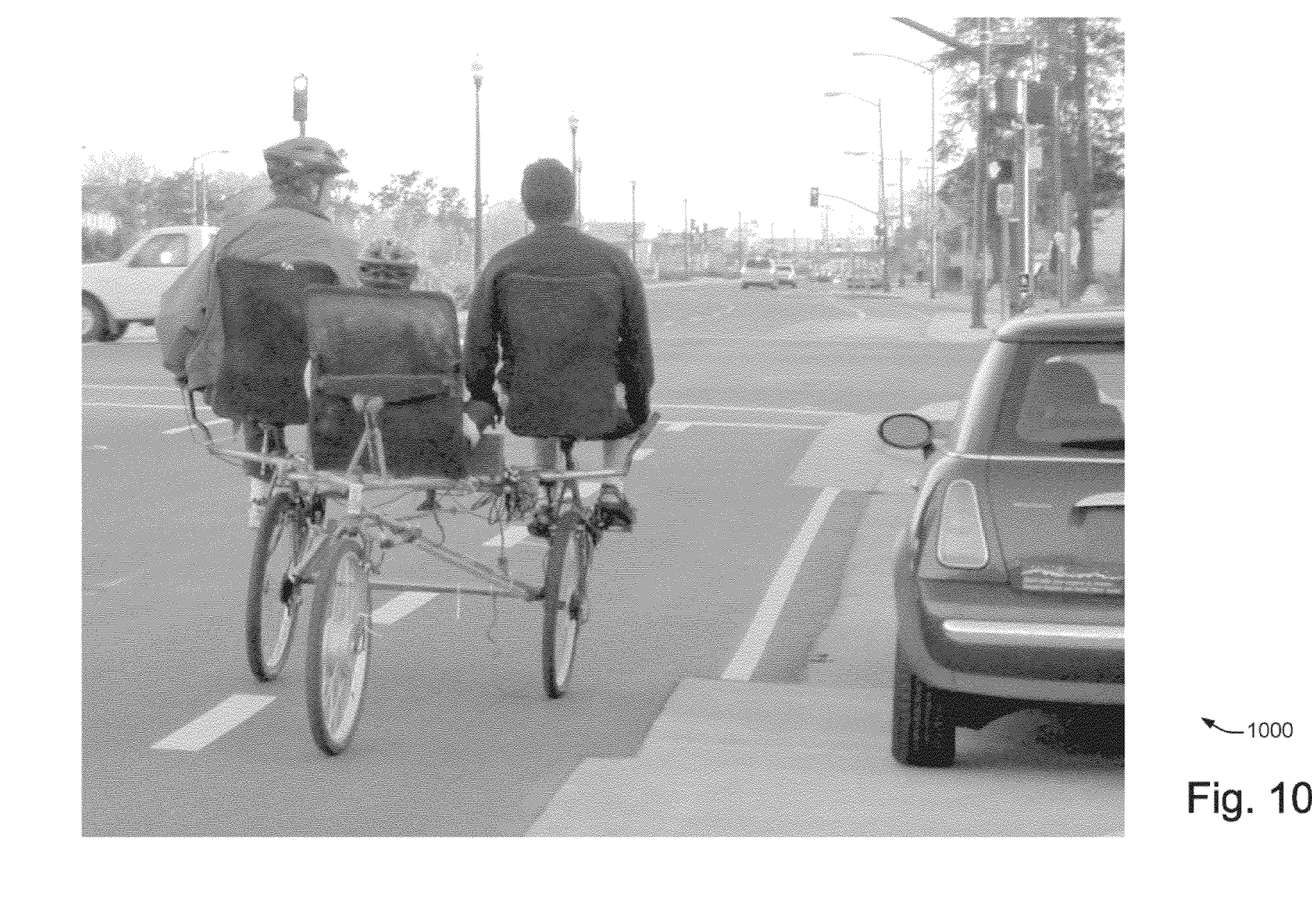
Figure 11:
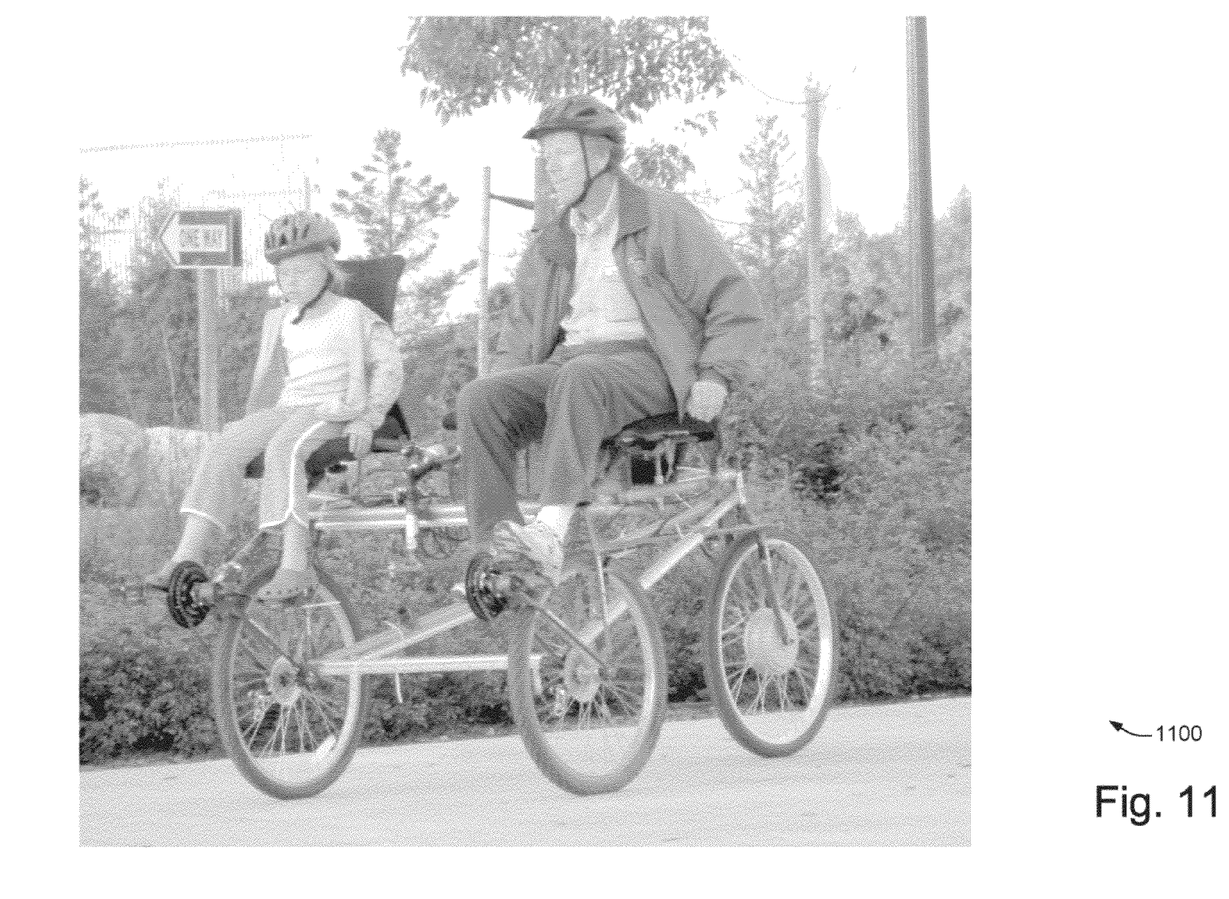

Various embodiments of the multi-person tricycle described here may include a number of different advantages, benefits and/or other features such as, for example, one or more of the following (e.g., or combinations thereof):

- A 3-wheel semi-recumbant vehicle.
- A plurality of frame members joining two front drive wheels to a rear steering wheel assembly.
- Side by side social seating. For example, in one embodiment, two drivers may sit side-by-side to converse with at least one other while driving/pedaling tricycle (e.g., 100)
- In at least one embodiment, a level of safety may be provided by the height of the tricycle maintaining the head height of the rider/riders at eye level with motor vehicle drivers in traffic. (see e.g., "H" FIG. 2; FIG. 10)
- Front drive wheel assemblies each with independent drive trains to allow at least one rider to pedal at their own cadence, level of force, or even to rest. In at least one embodiment, the steering and tracking may be substantially unaffected.
- Adjustable crossover rear steering affected by an adjustable push rod. (e.g., 7)
- Steering sensitivity adjustability (e.g., 7).
- Shared steering assembly allows either rider to have alternative focus (e.g., and/or even not pedal at various at times, such as, for example, while distracted by other tasks such as reading a map, texting, or accessing a rear storage compartment).
- In at least one embodiment, the entire tricycle may be built using the components of 2 standard bicycles with and a few other commonly available parts (e.g., shown in phantom in FIG. 6), making it an economical design option.
- Each front drive wheel assembly (or drive train assembly) may include, for example, a components from a conventional or traditional rear bicycle triangle, such as, for example, pedals, gears, chain, etc. One or more of these components have readily replaceable parts and may be serviced by any bicycle mechanic with no special training.
- Comfortable, adjustable multi-person seating for riders of different heights who may not find traditional bicycle seats comfortable.
- Adjustable steering dampening (e.g., 10, 15) for smooth riding at higher speeds (e.g., street traffic speeds) (e.g., adjustable).
- Steering limits prevent rear wheel assembly from being damaged from extreme turn angles (e.g., 25) (e.g., Illustrated by angle β)
- Steering limits prevent rear wheel assembly from tracking wider than the path of the two front wheel assemblies (e.g., Illustrated by angle α). (e.g., 26, 25)
- Two wheel up front configuration allows for easy determination of width clearance while navigating through a crowded location, and the steering limit may prevent the rear wheel assembly from rolling over obstacles cleared by the front wheel assemblies. This may be quite useful when courteously navigating around a crowd. (e.g., 25, angle α)
- Two wheel up front one in back allows for better stability in turns for tricycles (e.g., 100)
- Gussets (e.g., 70) added to frame parts to increase lateral strength. In at least one embodiment, this may be desirable due to high carriage of riders' body weight and to increase strength for carrying cargo.

Figure 4:
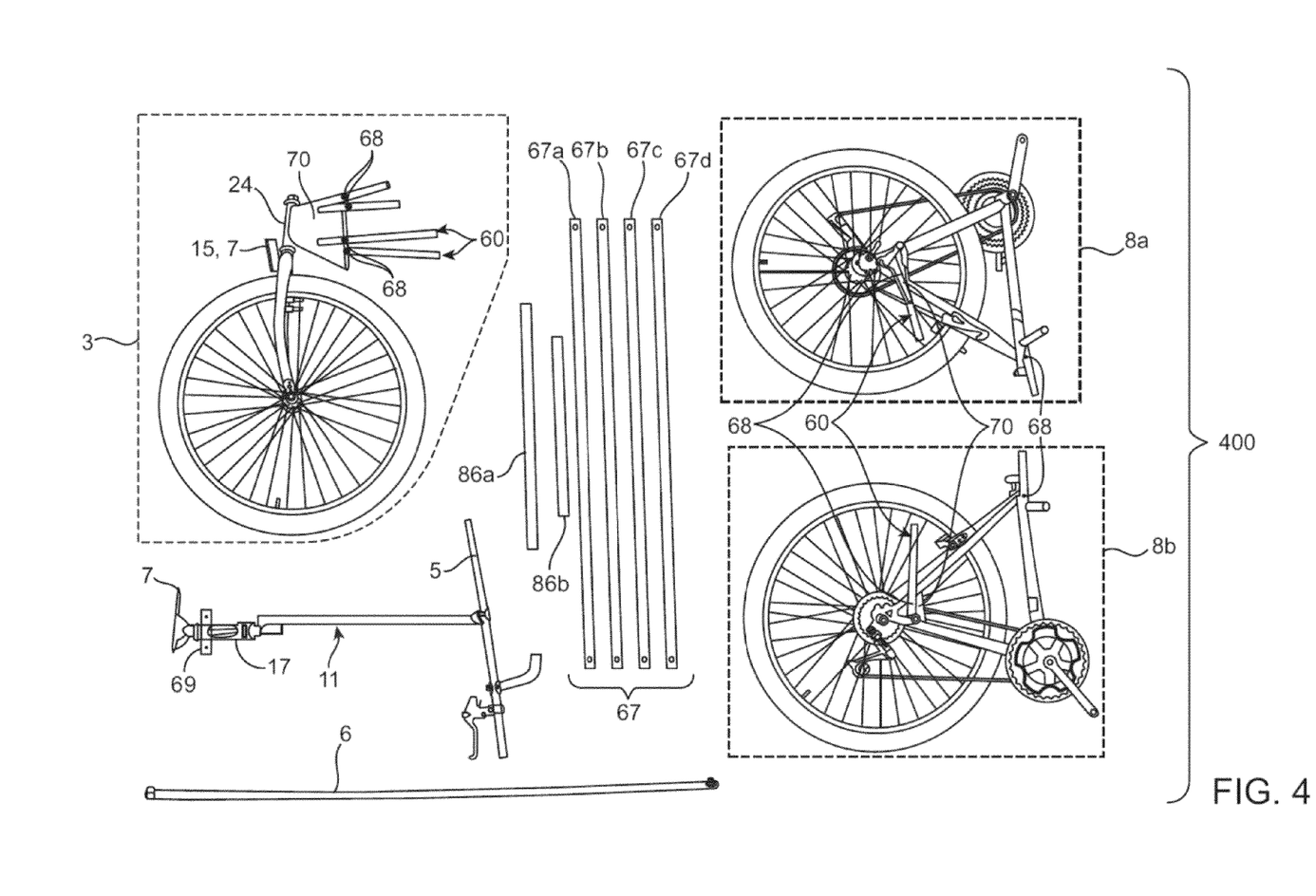
FIG. 4 illustrates an example showing how the multi-person tricycle of FIG. 1 may be broken down into a disassembled form.

FIG. 4 shows an alternative embodiment showing the entire three wheel multi-person vehicle from FIG. 1 in a disassembled state 400. Longitudinal frame members 67 may be identical and fit into receiving sleeves on rear wheel assembly 3 and front drive train assemblies 8. As illustrated in the example embodiment of FIG. 4, several of these mounted sleeves 60 may be extended, allowing longitudinal members to be interchangeable. In one alternative embodiment, these sleeves may be on pivots 68 and may be free to pivot horizontally. This pivoting action allows the wheel base to be adjusted for different riding conditions by interchanging lateral frame members 86 of different sizes.

Figure 6:
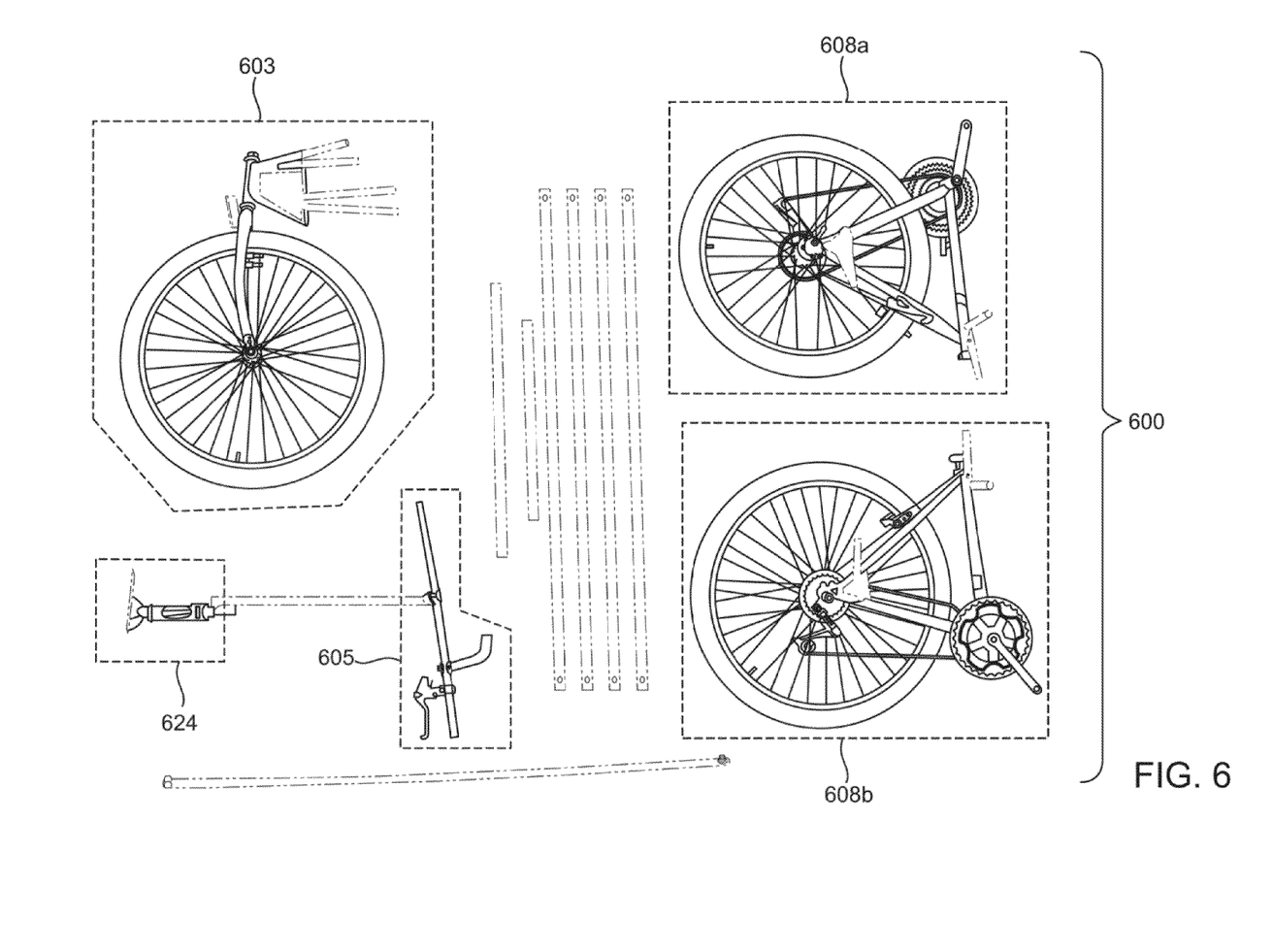
Figure 7:
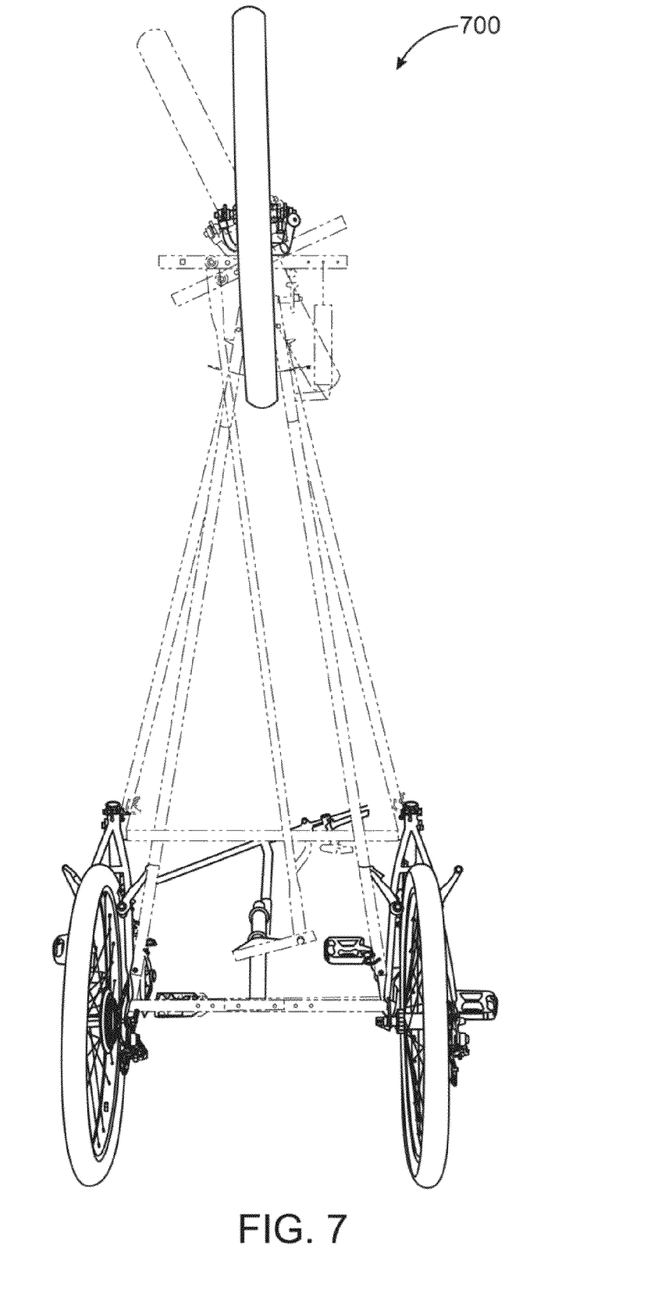
FIG. 7 illustrates the component set from FIG. 6 as viewed from a bottom perspective of the assembled vehicle.
Figure 8:
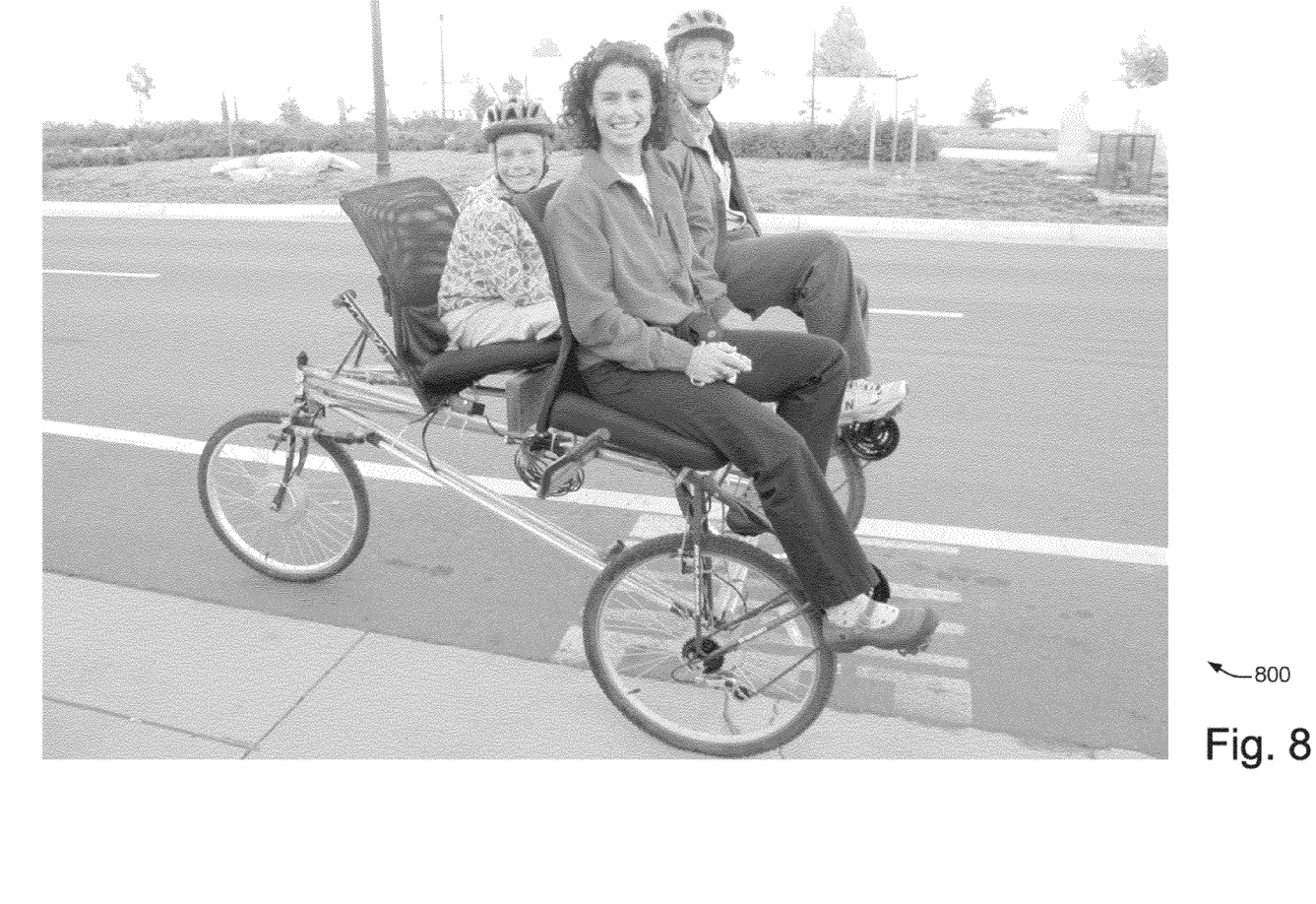
FIGS. 8-11 illustrate various examples of human riders operating at least one tricycle embodiment as described herein.
Figure 9:
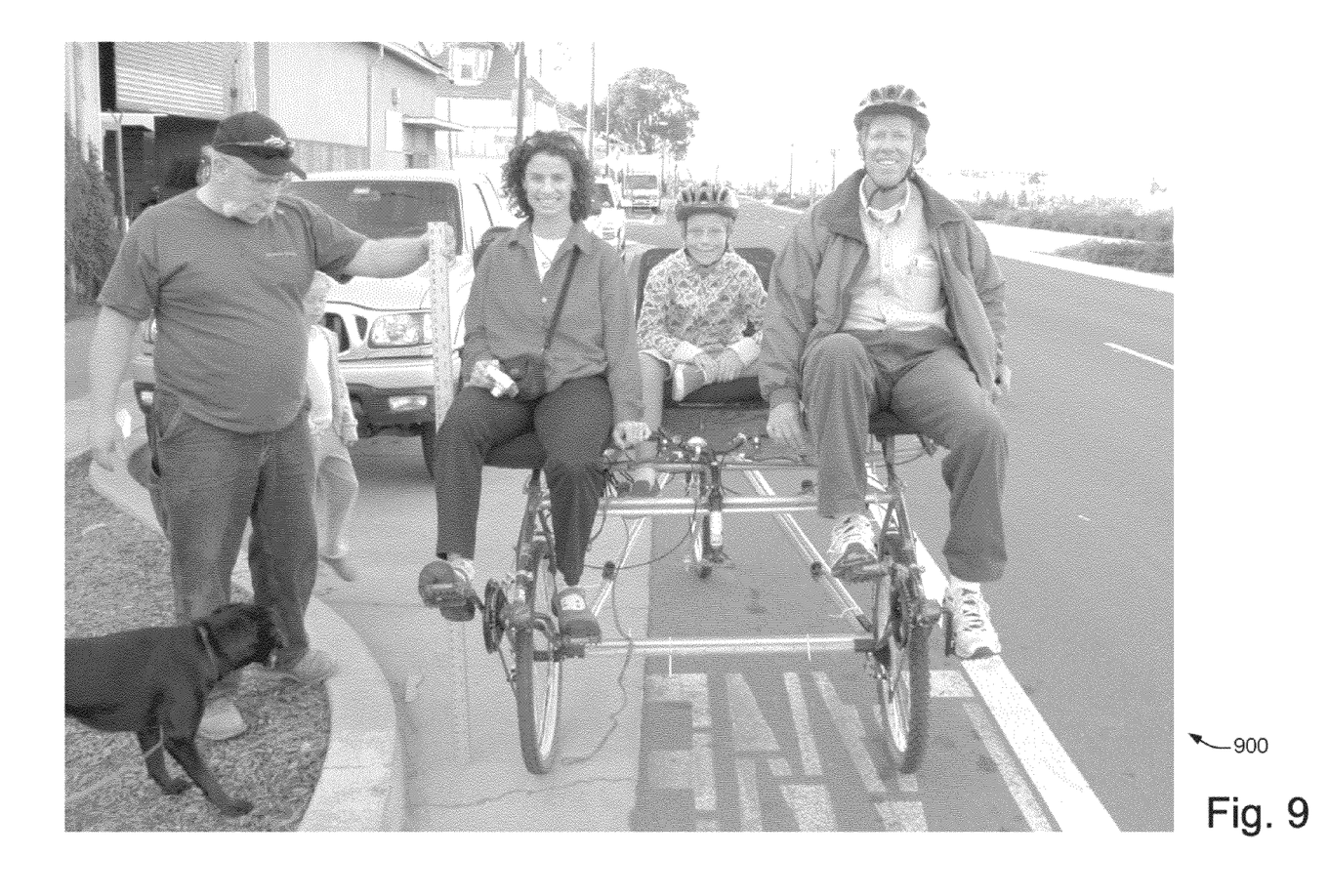

FIGS. 6 and 7 illustrate an alternative embodiment showing in phantom contrast the components sourced from two traditional bicycles and the complementary very few components needed to build an embodiment of multi-person multi-person tricycle, such as that shown, for example, in FIGS. 1-3.

FIGS. 8-11 illustrate various examples of human riders operating at least one tricycle embodiment as described herein.

Figure 12A:
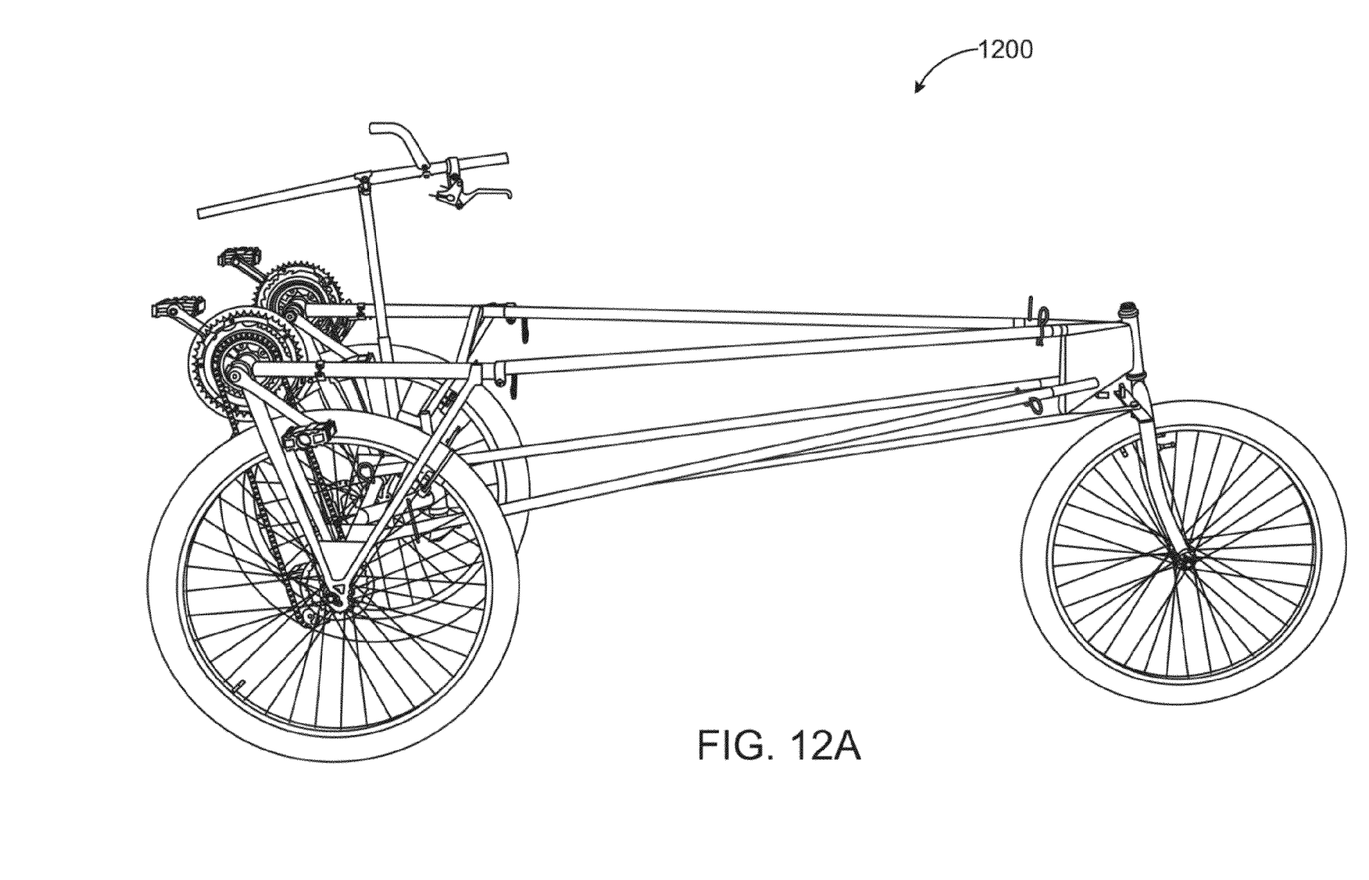
FIGS. 12A-12B illustrate other example embodiments of a multi-person tricycle with bench seat (e.g., 1250) and without bench seat (e.g., 1200).
Figure 12B:
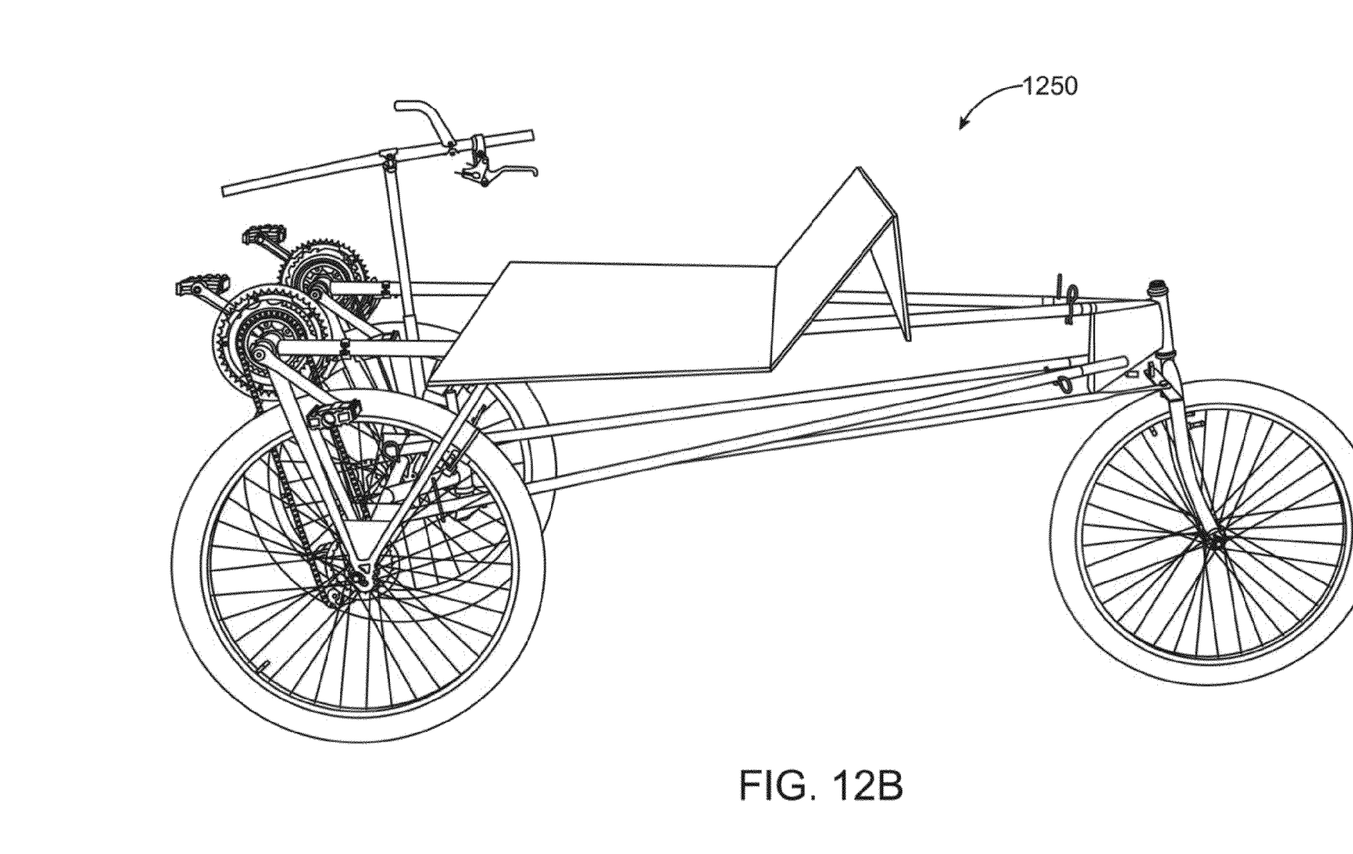

FIGS. 12A-12B illustrate other example embodiments of a multi-person tricycle with bench seat (e.g., 1250) and without bench seat (e.g., 1200).

Alternative Embodiments/Features (e.g., Not Shown)

- The two sets of pedals may be linked for a single rider to pedal from the center position (e.g., 30, FIG. 5).
- A bench seat (e.g., 44, FIG. 5) provides adjustable seating for single rider or 2 riders of different leg lengths.
- Battery storage (e.g., 85, FIG. 5) may function as counter balance if the rider is riding alone (e.g., on opposite side).
- The tricycle disassembles to take up less volume than two traditional bicycles.
- Additionally, the multi-person tricycle described herein may be easier to transport for the consumer than two traditional bicycles. In fact, the entire tricycle fits in most cars that cannot accommodate a single bicycle.
- When shipped, the disassembled multi-person tricycle may be stored in a box that may be smaller than two traditional bicycle shipping boxes.
- In one embodiment the chain and drive train do not change configuration between assembled and disassembled states so there is no need to handle or adjust a greasy or unwieldy chain during assembly or disassembly.
- One person may assemble or disassemble this vehicle in less than five minutes (e.g., 400) without the aid or use of any hand tools.
- Two lateral members may be substituted with different length members to affect different widths of wheel base for different riding conditions (e.g., 86).
- Pivots on longitudinal member sleeves allow for frame angle to change when wheel base may be changed (e.g., 68)
- Steering mount attached to sleeve on lower lateral member facilitating disassembly and storage, and a plurality of positional placements (e.g., 66) for different riding configurations (e.g., 69).

Mounts for the two lower longitudinal members may be extended to make multiple longitudinal members the same length (e.g., interchangeable for ease and speed of assembly). (e.g., 60)

Electric rear wheel assembly hub drive to be powered by battery and/or $3^{rd}$ rider pedaling a generator (e.g., 40).

Entire assembled vehicle may be stood on end balancing on front drive wheels and pedals or stand for easy storage.

Two independent drive trains leaves chain configuration unaltered whether assembled or disassembled.

Disassembled components occupy very little volume for transportation by consumer or for shipping.

By substituting two straight frame members, the wheel base may be adjusted for different riding conditions.

Side by side independent front wheel drive assemblies drive for one or more passengers.

Shared steering mechanism.

Independent force and cadence mechanism.

Novel and surprising convenience of disassembly and re-assembly.

New and novel tricycle configuration made primarily from the components of two traditional bicycles with surprising outcome of a safe and easy to operate vehicle.

Ease of maintenance by mechanics with no special training.

Replacement parts may be easily sourced

Although several example embodiments of one or more aspects and/or features have been described in detail herein with reference to the accompanying drawings, it may be understood that aspects and/or features may not be limited to these precise embodiments, and that various changes and modifications may be effected therein by one skilled in the art without departing from the scope of spirit of the invention (e.g., s) as defined, for example, in the appended claims.

It is claimed:

1. A multi-person tricycle comprising:
   three operable wheels, including two front drive wheels, and one rear steering wheel;
   two front wheel drive assemblies, each front wheel drive assembly including a respective one of the front drive wheels, each front wheel drive assembly having an independent drive train assembly;
   a rear wheel steering assembly operably connected to a steering mechanism, the rear wheel steering assembly including the rear steering wheel; and
   a frame assembly integrally connecting said front wheel drive assemblies and said rear wheel steering assembly to thereby form said multi-person tricycle;
   wherein the multi-person tricycle is configured or designed to enable two front-facing riders to each independently exert and/or vary his or her own pedaling force and/or pedaling cadence.

2. The tricycle of claim 1 wherein each front wheel drive assembly including a respective plurality of pedals.

3. The tricycle of claim 1 wherein the steering mechanism is independently operable by each rider of the multi-person tricycle.

4. The tricycle of claim 1 being configured or designed to enable two front-facing riders to sit side-by-side.

5. The tricycle of claim 1 wherein differences in the pedaling forces and/or pedaling cadences of each respective rider does not substantially affect a direction of travel of the multi-person tricycle.

6. The tricycle of claim 1 wherein the steering mechanism is controllable by either or both riders of the multi-person tricycle.

7. The tricycle of claim 1, wherein the tricycle includes exactly three operable wheels; and
   wherein the three operable wheels are each configured or designed to contact a road or surface while one or more riders are operating the tricycle.

8. The tricycle of claim 1:
   wherein the front wheel drive assemblies and rear wheel steering assembly are each configured or designed to be removably connectable to the frame assembly to thereby facilitate ease of disassembly and assembly of the multi-person tricycle.

9. A multi-person tricycle comprising:
   wheel means for transporting the tricycle on a road surface, the wheel means including two front drive wheels, and one rear steering wheel;
   front wheel drive means for delivering front wheel drive torque to the two front drive wheels of the tricycle;
   means for enabling two front-facing riders to each independently exert and/or vary his or her own pedaling force and/or pedaling cadence;
   rear wheel steering means for providing steering of the tricycle, the rear wheel steering means including rider steering means for enabling either or both riders of the tricycle to operably control the rear steering wheel; and
   frame assembly means for removably connecting the front wheel drive means and rear wheel steering means to thereby form said multi-person tricycle.

10. The tricycle of claim 9 further comprising:
    means for preventing differences in the pedaling forces and/or pedaling cadences of each respective rider from substantially affecting a direction of travel of the multi-person tricycle.

* * * * *